3,349,872
LEVER ACTUATED, SPOT TYPE DISC BRAKE
Antoine Brueder, Paris, France, assignor to Societe Anonyme Andre Citroen, Paris, France, a society of France
Continuation of application Ser. No. 352,582, Mar. 17, 1964. This application Apr. 18, 1966, Ser. No. 543,230
Claims priority, application France, Mar. 19, 1963, 928,524
2 Claims. (Cl. 188—73)

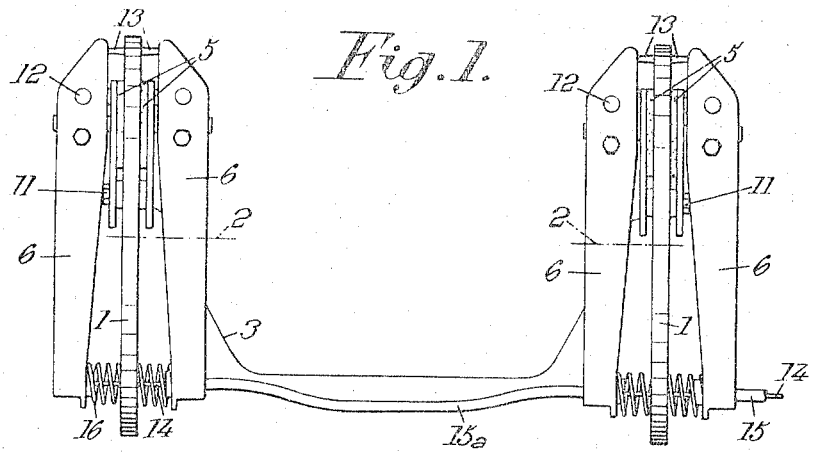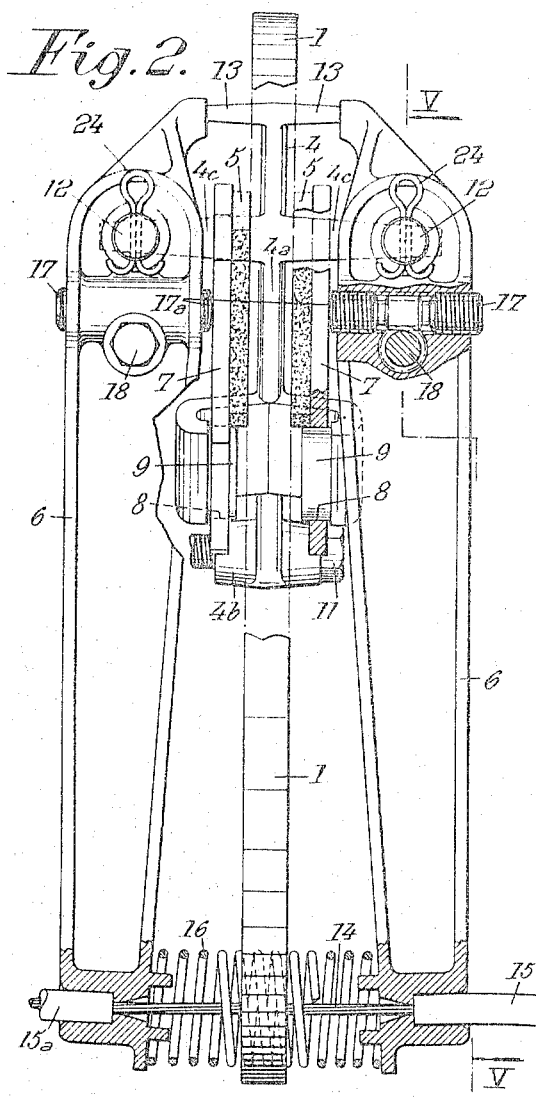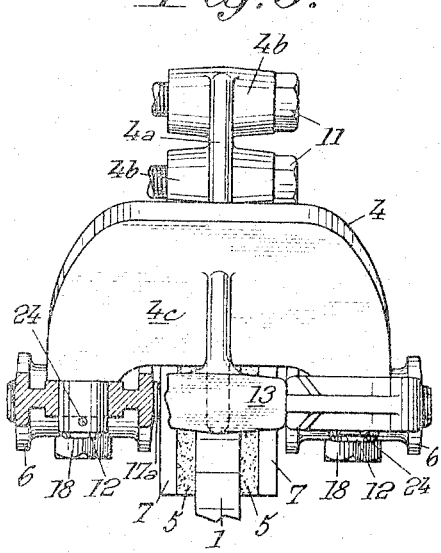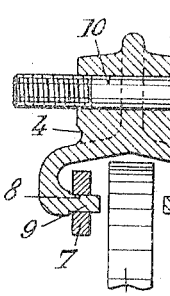
Oct. 31, 1967   A. BRUEDER   3,349,872
LEVER ACTUATED, SPOT TYPE DISC BRAKE
Original Filed March 17, 1964   2 Sheets-Sheet 1
INVENTOR
Antoine Brueder
BY Stevens, Davis, Miller & Mosher
ATTORNEYS Oct. 31, 1967  A. BRUEDER  3,349,872
LEVER ACTUATED, SPOT TYPE DISC BRAKE
Original Filed March 17, 1964
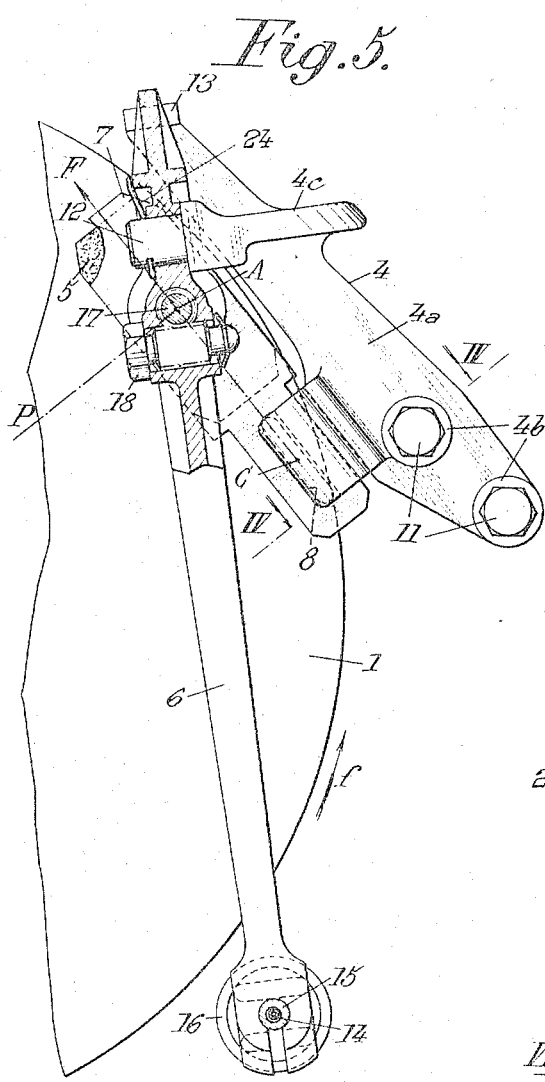
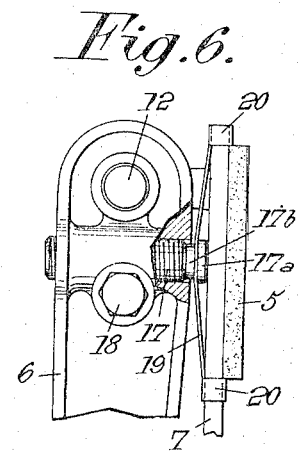
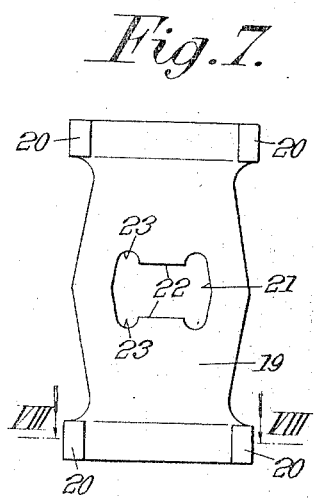
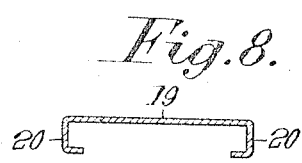
INVENTOR
Antoine Brueder
BY
Stevens, Davis, Miller & Mosher
ATTORNEY

United States Patent Office 3,349,872
Patented Oct. 31, 1967

ABSTRACT OF THE DISCLOSURE

The brake friction elements, which are carried by rigid plates on either side of the brake disc, may be applied against said disc for braking purposes by means of levers bearing on said plates and rotatable about pivots. These pivots are rigid with a fixed frame which is provided with projections of a non-circular cross section, these projections being slidable in openings of corresponding shape provided in the above-mentioned plates. Due to the mere cooperation of said projections and said openings, the plates have only the degree of freedom nececssary to enable them to slide in a direction parallel to the shaft of the brake disc.

---

This application is a continuation of U.S. application Ser. No. 352,582, filed Mar. 17, 1964, now abandoned.

The present invention relates to brakes comprising a fixed support for the shaft to be braked, a disc angularly fixed to this shaft, a rigid brake frame fixed with respect to said support, two friction linings carried on either side of the disc by said frame in such manner as to be slidable with respect thereto in a direction substantially parallel to said shaft, and control means, preferably mechanical control means, carried by said frame for applying each of said linings locally against the corresponding face of the disc when the brake is applied. The invention is more especially but not exclusively concerned with brakes for automobile vehicles.

In the brakes with which the invention is concerned, each of the brake linings is carried by a rigid plate having a surface thereof adapted slidably to engage a cooperating surface fixed with respect to the frame, said surfaces having a cylindrical shape with generatrices substantially parallel to the axis of the disc, this plate being so disposed that the resultant of the peripheral driving forces exerted, during braking periods, upon every lining (and the corresponding plate) passes substantially through the center of said projection.

According to the present invention, said opening and the projection slidably engaged therein are given a noncircular section enabling the linings to have only a movement of translation parallel to the disc axis, thus preventing rotation of these linings about an axis parallel to that of the disc.

Preferred embodiments of the present invention will be hereinafter described with reference to the appended drawings, given merely by way of example, and in which:

FIG. 1 is a diagrammatic elevational view of two disc brakes, for instance for the front or rear wheels of a motor vehicle, made according to the present invention;

FIG. 2 is an elevational view, with parts in section, of one of the brakes of FIG. 1;

FIG. 3 is a plan view of said brake, seen from the top of FIG. 2;

FIG. 4 is a section on the line IV—IV of FIG. 5;

FIG. 5 is a side elevation of said brake, with portions in section on the line V—V of FIG. 2;

FIG. 6 shows a modification of a portion of the brake of FIG. 2;

FIG. 7 is a plan view of an element of the brake of FIG. 6;

FIG. 8 is a sectional view on the line VIII—VIII of FIG. 7.

In the following description the invention will be described in the case of two brakes (FIG. 1), the discs 1 of which are coaxial and respectively fixed on shafts diagrammatically illustrated by dotted lines 2, said shafts being the output shafts of a differential gear housed in a casing 3 which is supposed to be common with the gear box casing of a motor car having a suspended differential.

Casing 3 constitutes a fixed support for the shafts 2 to be braked. Every brake comprises a frame 4 rigid and fixed with respect to said casing 3, two brake linings 5 mounted on opposite sides respectively of disc 1 and carried by frame 4 so as to be slidable with respect thereto in a direction substantially parallel to shaft 2, and mechanical control means (including levers 6), carried by frame 4, for applying each of the brake linings 5 against the corresponding face of the disc when the brake is to be applied.

Each of the brake linings 5 is carried by a rigid plate 7, each brake lining 5 together with the corresponding plate 7 forming a friction element. Each plate 7 is provided with an opening 8 and it is slidable freely in a direction parallel to the axis of disc 1 along a projection 9 rigid with frame 4. Therefore this projection 9 and the opening 8 in which it fits slidably are of cylindrical shape with generatrices substantially parallel to said axis of disc 1. Plate 7 is given a direction such that the resultant of the friction forces acting, when the brake is applied, on a brake lining 5 (and therefore on the corresponding plate 7) passes substantially through the center C (FIG. 5) of projection 9. This resultant is diagrammatically shown in solid lines by arrow F in FIG. 5 for the direction of rotation corresponding to forward running as indicated by arrow $f$. It is perpendicular to the plane P passing through the axis of disc 1 and through the point of application A of this resultant F. It is known that this point A is located, for every brake lining 5, at the center of the surface thereof.

According to the present invention, each of the openings 8 and the projection 9 fitting slidably thereon are given noncircular cross sections by planes parallel to that of the disc. In other words, plate 7 can move only with translatory displacements parallel to the axis of disc 1. As shown by the drawings, projection 9 is for instance given the shape of a cylinder having its generatrices parallel to the axis of disc 1 and the directrix of which is different from a circle. Of course this projection might be constituted by two cylindrical pins disposed respectively at the ends of elongated opening 8.

As shown by the drawings (FIG. 5), lining 5 (and plate 7) is given a shape elongated in the direction of resultant F, opening 8 (and projection 9) being of elongated shape in the same direction. For instance, as shown, opening 8 is in the form of a rectangle having rounded corners. It might also be of oval shape.

In the embodiment shown by the drawings, frame 4 comprises a web 4a disposed in the plane of disc 1 at a small distance from the periphery thereof, this web being thus nearly tangent to disc 1. Projections 9 are integral with web 4a and advantageously, as shown by the drawings, they are directed toward the plane of disc 1. Web 4a also carries two bosses 4b provided with holes such as 10 for accommodating screws 11 (FIG. 4) intended to be tightly engaged in casing 3 so as to permit of fixing frame 4 thereto.

Web 4a further comprises, integral therewith, two wings 4c extending therefrom and carrying pivots 12 about which are mounted levers 6. Web 4a further carries two abutments 13 for limiting the angular displacements of said levers 6. As shown by the drawings, pivots 12 are advantageously integral with frame 4 (same as projections 9, bosses 4b, wings 4c and abutments 13) and they accommodate locking pieces 24 for securing lever 6.

Concerning levers 6, they are arranged as follows:

Considering the cylinder having its generatrices parallel to the axis of disc 1 (that is to say perpendicular to the plane of FIG. 5) and the directrix of which is the external outline of this disc, the plane (perpendicular to that of FIG. 5) in which each of said lever 6 is to move, intersects said cylinder in such manner that the point where each of the levers is connected to the control mechanism (cable 14 movable in sheath 15 for instance) is on the outside of said cylinder in a region distant from that where pivots 12 are located, said pivots being at a small distance from the periphery of this cylinder. In the case where the control means consist of a cable 14 movable in a sheath 15, as shown by the drawings, cable 14 passes freely from one lever 6 to the other at a small distance from the external edge of the corresponding disc 1 (see FIG. 5). In order to release the brake, it suffices to provide a coil spring 16 interposed between levers 6, this spring surrounding cable 14. The angular displacement of levers 6 under the action of this spring 16 is limited by the above mentioned abutments 13. In the case, illustrated by FIG. 1, of a pair of disc brakes, it is advantageous to make use of a single cable 14 secured to one of the outer levers 6 (that on the left hand side of FIG. 1), this cable passing through a sheath 15a disposed between the two inner levers 6, then through sheath 15 toward the control means (hand or foot lever).

In order to transmit the action of levers 6 on plates 7, each of said levers has a bearing surface the center of which is at point A above referred to (FIG. 5), this point being located between pivots 12 and the connection point with the control means. Advantageously this bearing surface is arranged in such manner as to be adjustable in position in the direction perpendicular to disc 1. For this purpose, in the embodiment shown by the drawings, the bearing surface is the end 17a of a screw 17 engaged in the corresponding lever 6. An adjustment is effected by means of a tangential screw 18 mounted in lever 6 so as to be capable of rotating about its axis without having any axial displacements. This screw 18 meshes with a pinion provided in the middle portion of screw 17.

The whole may further include a resilient clip 19 connecting each plate 7 with the corresponding lever 6, in order to cause the corresponding brake lining 5 to follow the displacements of lever 6 and in particular to move away from disc 1 when the brake is being disengaged. Said clip 19 is for instance kept in position by cooperation with the corresponding adjustment screw 17. As shown by FIGS. 6 to 8, said clip 19 may be constituted by a spring steel plate having lateral jaws 20 adapted to hold plate 7 and provided with a hole 21 for the passage of the head 17a of screw 17 engaged as far as a groove 17b provided in this screw. As shown by FIG. 7, opening 21 may be limited by two opposed tongues 22 and by notches 23.

The operation of this brake is as follows:

When cable 14 is pulled, levers 6 are caused to rotate about their respective pivots 12 in the direction that moves the ends 17a of screws 17 toward each other. Said screws, applied against plates 7, push linings 5 against the corresponding faces of disc 1. Each plate 7, when sliding without rotating along projections 9, keeps the direction shown by FIG. 1, where the resultant F of the driving forces passes through the center C of the corresponding projection 9. This resultant is thus transmitted, through projections 9 to frame 4 without causing deformation of plate 7. When the pulling action of cable 14 is stopped, spring 16 returns levers 6 into their initial positions against abutments 13 and clips 19 move linings 5 away from disc 1. In order to adjust the brake, it suffices to act upon screws 18.

In order to substitute fresh linings 5 to worn linings, the screws 11 that keep the whole of the brake together are removed. Support 4 is moved away from disc 1 so as to disengage plates 7 inwardly. The same operations are performed in the reverse order with the fresh plates and brake linings.

Such a brake has many advantages, especially concerning its simplicity of construction and its low cost. As a matter of fact it comprises a small number of elements, frame 4 performing by itself several functions which up to now were performed by distinct elements.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What is claimed is:

1. In a system including a fixed frame and a driven shaft journalled with respect to said frame, a braking device which comprises, in combination, a disc fixed coaxially to the driven shaft, two flat friction elements mounted parallel to said disc on opposite sides thereof and located respectively adjacent limited peripheral portions thereof, with the centers of said friction elements lying in a common radial plane of said disc, an extension rigid with each said friction element defining a surface in the form of a cylinder having a non-circular cross section and characterized by a long axis, with the generatrices of said cylinder lying normal to the plane of said disc, said frame defining a pair of surfaces in the form of cylinders each of which interfits, engages, and matches with a surface defined by an extension, each set of said interfitted, engaged, and matched surfaces mutually cooperating to guide its associated friction element in a direction normal to said disc, said non-circular in section cylindrical surfaces forming the only means for holding said friction elements, all said surfaces being oriented angularly with respect to said disc so that each of said friction elements has the long axis of its cross section extending in a direction perpendicular to said radial plane and disposed so that the resultant of the forces applied thereto in the plane thereof during braking passes substantially along the line of the long axis of its associated cylindrical surfaces, and control means carried by said frame and operatively engaging said friction elements for urging them against said limited peripheral portions of the corresponding faces of said disc.

2. In a system as defined in claim 1 wherein the surface defined by each said extension is in the form of a recess and the matching surface defined by said frame is in the form of a projection which is received in said recess for relative sliding motion.

References Cited

UNITED STATES PATENTS 3,135,359    6/1964    Davis _____ 188—73

FOREIGN PATENTS 838,505    6/1960    Great Britain.
894,821    4/1962    Great Britain.

MILTON BUCHLER, *Primary Examiner.*

G. E. HALVOSA, *Assistant Examiner.*